United States Patent
Nomura et al.

(10) Patent No.: US 10,498,459 B2
(45) Date of Patent: Dec. 3, 2019

(54) OPTICAL TRANSMITTER AND SKEW COMPENSATION METHOD

(71) Applicant: FUJITSU LIMITED, Kawasaki-shi, Kanagawa (JP)

(72) Inventors: Yoshitaka Nomura, Shinagawa (JP); Tomofumi Oyama, Kawasaki (JP); Hisao Nakashima, Kawasaki (JP); Yuichi Akiyama, Kawasaki (JP); Takeshi Hoshida, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 2 days.

(21) Appl. No.: 16/005,748

(22) Filed: Jun. 12, 2018

(65) Prior Publication Data

US 2018/0367220 A1    Dec. 20, 2018

(30) Foreign Application Priority Data

Jun. 14, 2017  (JP) ................................. 2017-117116

(51) Int. Cl.
*H04B 10/58*  (2013.01)
*H04B 10/079*  (2013.01)
*H04B 10/50*  (2013.01)

(52) U.S. Cl.
CPC ......... *H04B 10/58* (2013.01); *H04B 10/0795* (2013.01); *H04B 10/0799* (2013.01); *H04B 10/5057* (2013.01)

(58) Field of Classification Search
CPC .............. H04B 10/548; H04B 10/0795; H04B 10/0799; H04B 10/58; H04B 10/5057
See application file for complete search history.

(56) References Cited

U.S. PATENT DOCUMENTS

| | | | |
|---|---|---|---|
| 9,184,834 B1* | 11/2015 | Zhang | H04B 10/50 |
| 2008/0170864 A1* | 7/2008 | Nishihara | H04B 10/5162 398/188 |
| 2010/0080570 A1* | 4/2010 | Conroy | H04B 10/5057 398/154 |

FOREIGN PATENT DOCUMENTS

| | | |
|---|---|---|
| JP | 2008-172714 | 7/2008 |
| WO | 2012/093416 | 7/2012 |

* cited by examiner

*Primary Examiner* — Ted M Wang
(74) *Attorney, Agent, or Firm* — Fujitsu Patent Center

(57) ABSTRACT

There is provided an optical transmitter including a modulator, a signal generator configured to generate in-phase or anti-phase skew adjustment signals that are identical in amplitude and frequency as signals to be input into an I axis and a Q axis of the modulator, a skew adjuster configured to perform skew adjustment upon the skew adjustment signals, a light source configured to enter light into the modulator, a monitor configured to monitor light that has been modulated using the skew adjustment signals and output from the modulator, a power detector configured to detect power of monitor light, and a controller configured to determine a skew adjustment amount with which average power of the monitor light is at a maximum or minimum value as an optimum skew adjustment value while changing a skew adjustment amount of the skew adjuster.

6 Claims, 19 Drawing Sheets

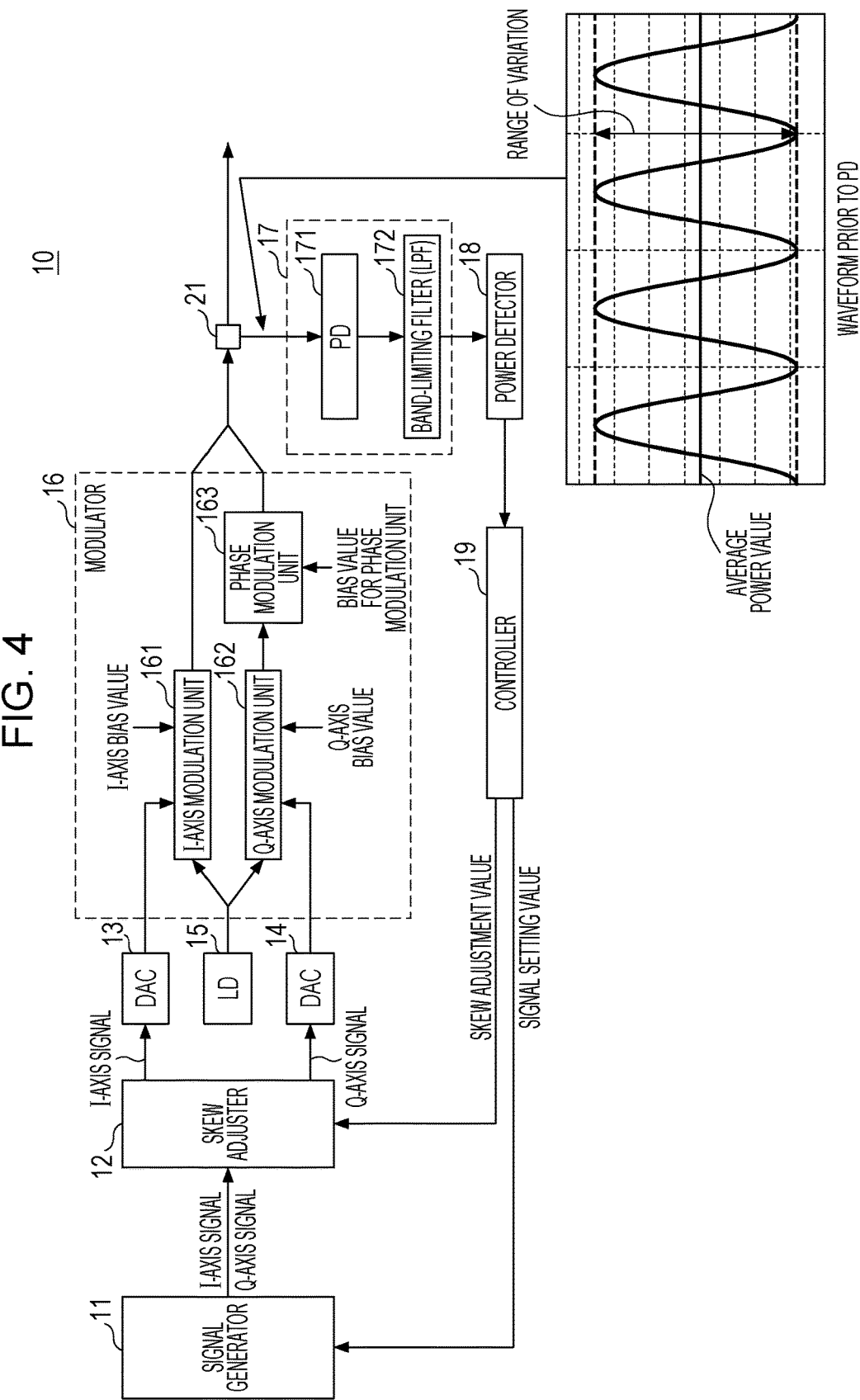

I-AXIS SIGNAL          Q-AXIS SIGNAL

FIG. 12

| FREQUENCY OF SINUSOIDAL WAVE [Hz] | DETECTABLE SKEW AMOUNT [ps] |
|---|---|
| 16 G | APPROXIMATELY ±31 |
| 8 G | APPROXIMATELY ±62 |
| 4 G | APPROXIMATELY ±125 |
| 2 G | APPROXIMATELY ±250 |

OPTICAL TRANSMITTER AND SKEW COMPENSATION METHOD

CROSS-REFERENCE TO RELATED APPLICATION

This application is based upon and claims the benefit of priority of the prior Japanese Patent Application No. 2017-117116, filed on Jun. 14, 2017, the entire contents of which are incorporated herein by reference.

FIELD

The embodiment discussed herein is related to an optical transmitter and a skew compensation method.

BACKGROUND

With increasing communication traffic, a demand for a large-capacity optical network increases. A large-capacity optical network can be provided by increasing a baud rate or the multi-level degree of a modulation method. A baud rate is the number of times of digital data modulation per unit time. In a case where a baud rate is increased in quadrature multi-level modulation, signal transmission performance is degraded and a data reception error occurs on a receiving side in a state where a skew remains between an I (in-phase component) axis and a Q (quadrature component) axis of a transmitter. "In-phase/quadrature skew," "I/Q skew," or simply "skew" refers to the relative phases of the in-phase and quadrature (I/Q) components in optical coherent modulation formats. For the prevention of a reception error due to a skew, adjustment for minimizing a skew between the I axis and the Q axis is performed on a transmission side.

In general, in order to adjust a skew compensation amount, an evaluation value (Q value) is acquired on the receiving side while the setting value of a skew adjustment unit is changed on the transmission side and a skew adjustment value with which the best Q value is acquired is selected.

On the other hand, a configuration is known in which the pattern widths of data signals Pa and Pb generated from a pattern generator in an optical communication apparatus are reduced in stages and the amount of delay of a delay element is controlled until signal power Spower of a modulated optical signal is lower than or equal to a reference value Th in respective pattern widths (see, for example, International Publication Pamphlet No. WO 2012/093416).

SUMMARY

According to an aspect of the invention, an optical transmitter includes a modulator, a signal generator configured to generate in-phase or anti-phase skew adjustment signals that are identical in amplitude and frequency as signals to be input into an I axis and a Q axis of the modulator, a skew adjuster configured to perform skew adjustment upon the skew adjustment signals, a light source configured to enter light into the modulator, a monitor configured to monitor light that has been modulated using the skew adjustment signals and output from the modulator, a power detector configured to detect power of monitor light, and a controller configured to determine a skew adjustment amount with which average power of the monitor light is at a maximum or minimum value as an optimum skew adjustment value while changing a skew adjustment amount of the skew adjuster.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is a diagram illustrating the waveform of monitor light entering a light-receiving element;

FIG. 12 is a diagram illustrating a skew amount detectable at each frequency used for skew adjustment;

DESCRIPTION OF EMBODIMENT

A common skew adjustment method in the related art uses a coherent receiver to measure a Q value on a receiving side. For the measurement of a Q value, setting information is shared between transmission and receiving sides. Subsequently, skew adjustment control is performed. Since a series of pieces of processing including coherent transmitter/receiver control such as the measurement of a Q value, the detection of a transmission skew, and the giving of feedback to the transmission side is performed, the volume of processing is increased and a circuit scale is increased.

A technique for accurately compensating for a transmission skew between the I axis and the Q axis on a transmission side in optical communication will be described in detail below with reference to the accompanying drawings. A disclosed technique is not limited to the following embodiment.

Embodiment

In this embodiment, in order to determine an optimum skew adjustment value on the transmission side, a predetermined bias voltage is set for a modulator and signals that are identical in amplitude and frequency and have the same phase or opposite phases are used as skew adjustment signals to be input into the I axis and the Q axis of the modulator. A skew adjustment signal is, for example, a sinusoidal signal. Depending on the bias condition of the modulator, skew adjustment signals whose phases are the same (hereinafter referred to as "in-phase") or are 180° out of phase (hereinafter referred to as "anti-phase") are input into the I axis and the Q axis of the modulator. A skew compensation amount is determined such that the average power of monitor light output from the modulator is at the optimum level.

In another example, the frequency of a signal to be input into the modulator is changed in turn or a continuous manner. A skew adjustment value is controlled such that the average power value of monitor light becomes the optimum value (for example, the maximum or minimum value) at all frequencies used for skew adjustment.

Based on a bias condition set for the modulator and the phase relationship between skew adjustment signals input into the modulator, a skew adjustment value is controlled such that the average power of monitor light is at the optimum level. As a result, it is possible to accurately compensate for a transmission skew without using feedback information transmitted from the receiving side for skew adjustment.

Figure 1:
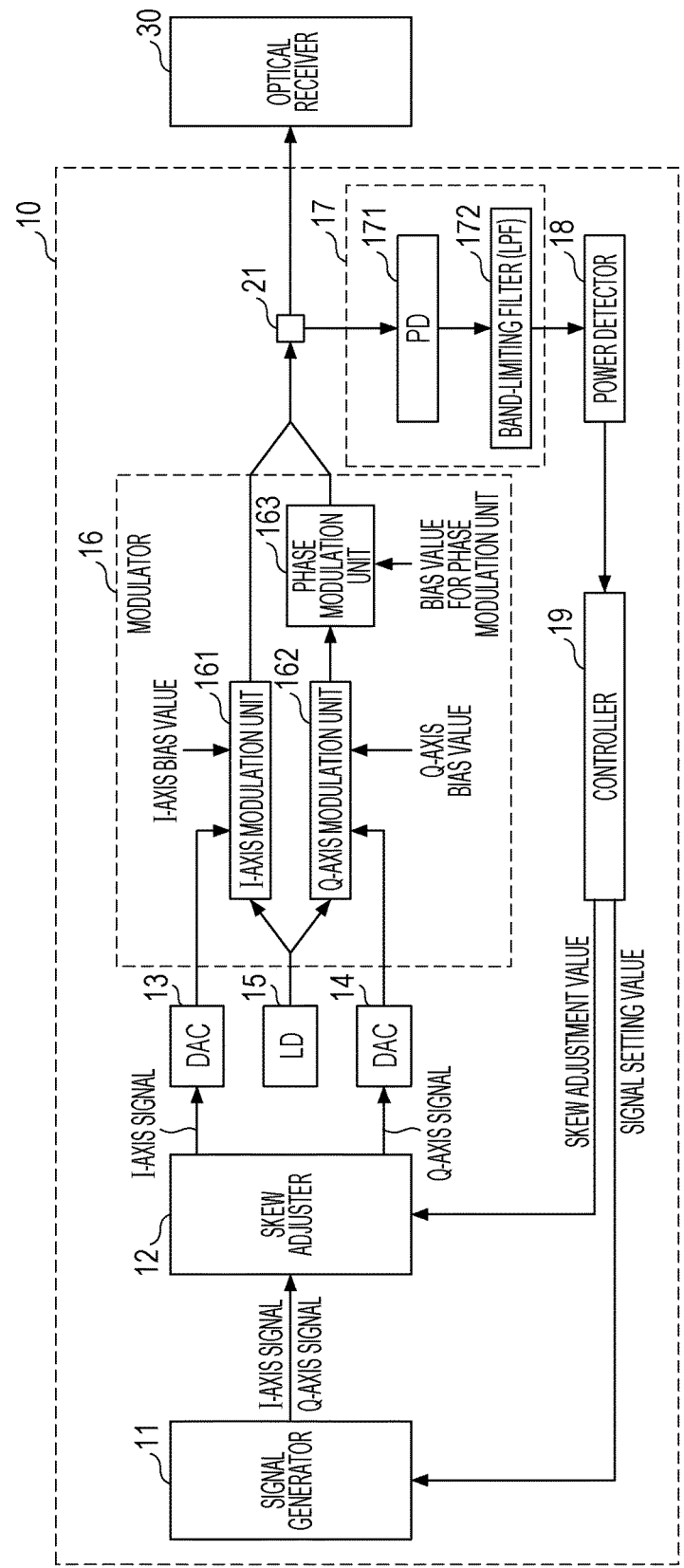
FIG. 1 is a schematic diagram of an optical transmitter according to an embodiment.

FIG. 1 is a schematic diagram of an optical transmitter 10 according to an embodiment. The optical transmitter 10 is used in an optical transmission system 1, and transmits/receives an optical signal to/from an optical receiver 30. The optical transmitter 10 employs a quadrature modulation method such as quadrature phase shift keying (QPSK), differential quadrature phase shift keying (DQPSK), or quadrature amplitude modulation (QAM). Although QAM is a type of amplitude modulation, QAM is included in the quadrature modulation method since it uses phase components that are orthogonal to each other. The optical transmitter 10 minimizes a transmission skew between the I axis and the Q axis without using feedback information transmitted from the optical receiver 30.

The optical transmitter 10 includes a signal generator 11, a skew adjuster 12, an I-axis digital-to-analog converter (DAC) 13, a Q-axis DAC 14, a light source 15, a modulator 16, a monitor circuit 17, a power detector 18, and a controller 19.

The signal generator 11 generates a test signal for skew adjustment before operation, for example, at the time of startup or shipment. An I-axis signal and a Q-axis signal are output from the signal generator 11 and are input into the skew adjuster 12. As will be described below, the signal generator 11 generates, for skew adjustment, signals of different frequencies or a chirp signal whose frequency continuously changes. An actual data signal generator is provided separately from the skew adjustment signal generator 11, and the connection target of the skew adjuster 12 may be switched between the data signal generator and the signal generator 11 at the time of skew adjustment and operation.

The I-axis signal and the Q-axis signal are subjected to skew adjustment in the skew adjuster 12. The I-axis signal is converted into an analog signal in the DAC 13, and the Q-axis signal is converted into an analog signal in the DAC 14. The I-axis signal and the Q-axis signal are then input into the modulator 16. The modulator 16 is a Mach-Zehnder modulator, and includes an I-axis modulation unit 161, a Q-axis modulation unit 162, and a phase modulation unit 163. Each of the I-axis modulation unit 161 and the Q-axis modulation unit 162 is formed of, for example, a Mach-Zehnder (MZ) interferometer, and performs light modulation using an electro-optical effect or a semiconductor electro-absorption effect.

Light output from the light source 15 such as a laser diode (LD) is spilt and guided to the I-axis modulation unit 161 and the Q-axis modulation unit 162. Light that has entered the I-axis modulation unit 161 carries a signal input into the I-axis modulation unit 161 and propagates. Light that has entered the Q-axis modulation unit 162 carries a signal input into the Q-axis modulation unit 162, propagates, and is subjected to predetermined phase rotation in the phase modulation unit 163.

Light that has passed through the I axis of the modulator 16 and light that has passed through the Q axis of the modulator 16 are coupled to be output light of the modulator 16. A part of the output light is extracted by the splitter 21 such as an optical coupler as monitor light for skew adjustment and is supplied to the monitor circuit 17. The monitor circuit 17 includes a light-receiving element 171 such as a photodiode (PD) and a band-limiting filter 172 such as a low-pass filter (LPF). The monitor light is converted into a photocurrent proportional to incident intensity in the light-receiving element 171, is subjected to the removal of a high-frequency component in the band-limiting filter 172, and is supplied to the power detector 18 as a monitor signal.

As the light-receiving element 171, a monitoring PD disposed in the modulator 16 for the bias control of the modulator 16 or a PD for monitoring the power of output light of the optical transmitter 10 may be used. Alternatively, a low-speed PD may be separately disposed.

The power detector 18 detects the power of the monitor signal. Power detected by the power detector 18 is a power value corresponding to the adjustment value set for the skew adjuster 12. A result of the power detection is supplied to the controller 19.

The controller 19 acquires average power from the power detection result and determines a skew adjustment amount with which the power of monitor light becomes the optimum value (the maximum or minimum value) at all frequencies used for skew adjustment as an optimum skew adjustment value. The controller 19 also controls the parameter and output timing of a skew adjustment signal generated by the signal generator 11.

At the time of skew adjustment, the bias voltages of the I-axis modulation unit 161, the Q-axis modulation unit 162, and the phase modulation unit 163 in the modulator 16 are set to predetermined voltages. These bias voltages may be controlled by the controller 19 or may be externally set. As will be described in detail below, the bias voltage of the phase modulation unit 163 is controlled such that the phase difference between light propagating through the I axis and light propagating through the Q axis becomes zero in a case where the modulation of an input signal is not performed. In a case where the modulation of an input signal is not performed, the bias voltages of the I-axis modulation unit 161 and the Q-axis modulation unit 162 are controlled such that lights propagating through the I and Q axes are identical in amplitude to each other and are inverted in optical phase (π radian rotation) with respect to each other.

An adjustment value set for the skew adjuster 12 is adjusted to an optimum value with which monitor light has the maximum or minimum power value based on the phases of a skew adjustment I-axis signal and a skew adjustment Q-axis signal. During the operation of the optical transmitter 10, a data signal to be transmitted is subjected to skew compensation using a skew adjustment value that has been adjusted to an optimum value and is then input into the modulator 16. During the operation, the bias voltage of the phase modulation unit 163 is controlled such that the phase rotation of 90° occurs between lights passing through the I and Q axes.

Figure 2:
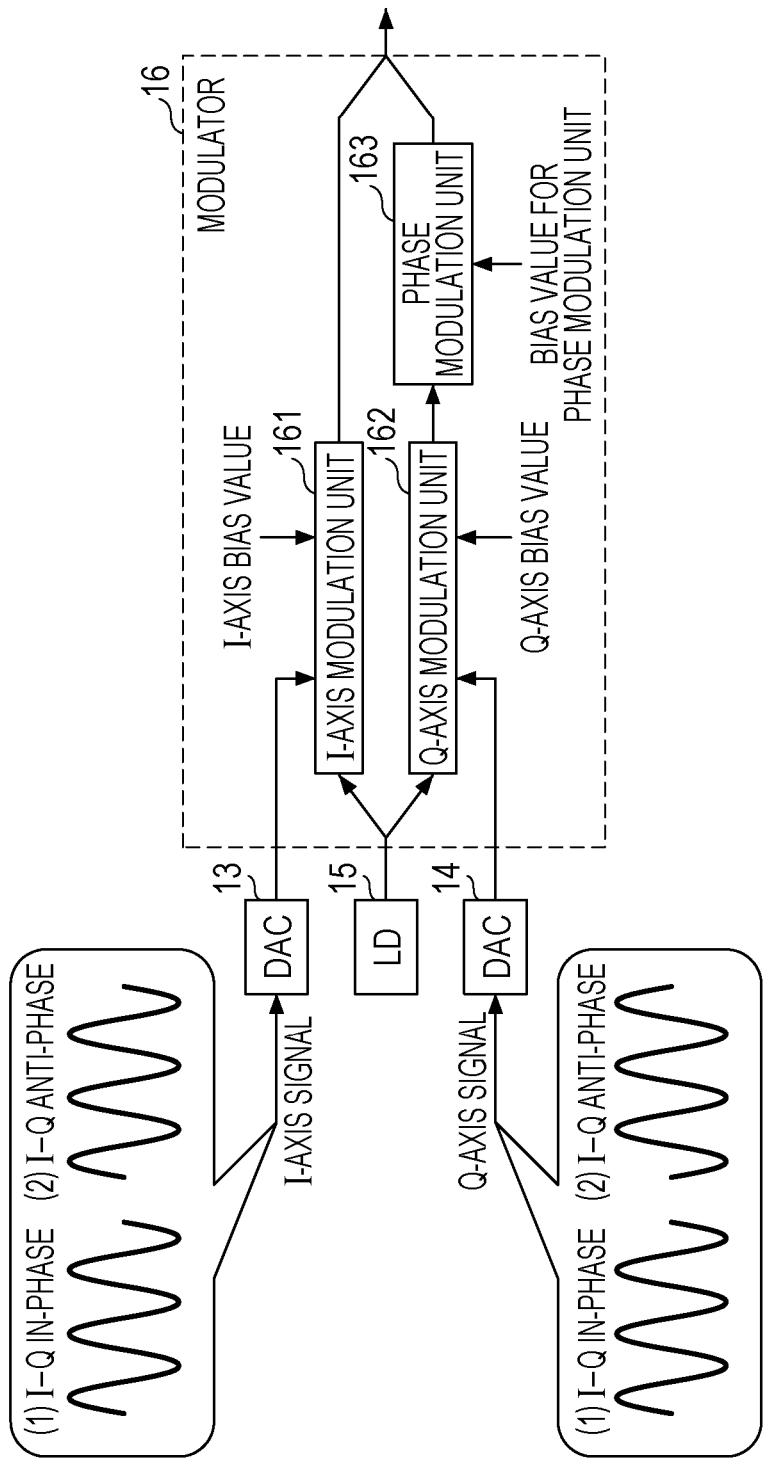
FIG. 2 is a diagram illustrating exemplary signal waveforms generated for skew adjustment.

FIG. 2 is a diagram describing signal waveforms generated by the signal generator 11 that is one of features of the optical transmitter 10 according to an embodiment. An I-axis signal and a Q-axis signal to be input into the modulator 16 are signals whose amplitudes and frequencies have the same periodic function. An I-axis signal and a Q-axis signal may have the same phase or opposite phases. In an example (1) in FIG. 2, as an I-axis signal and a Q-axis signal, in-phase sinusoidal waves are used. In an example (2), as an I-axis signal and a Q-axis signal, sinusoidal waves that are inverted in phase (π radian rotation) with respect to each other are used.

Figure 3:
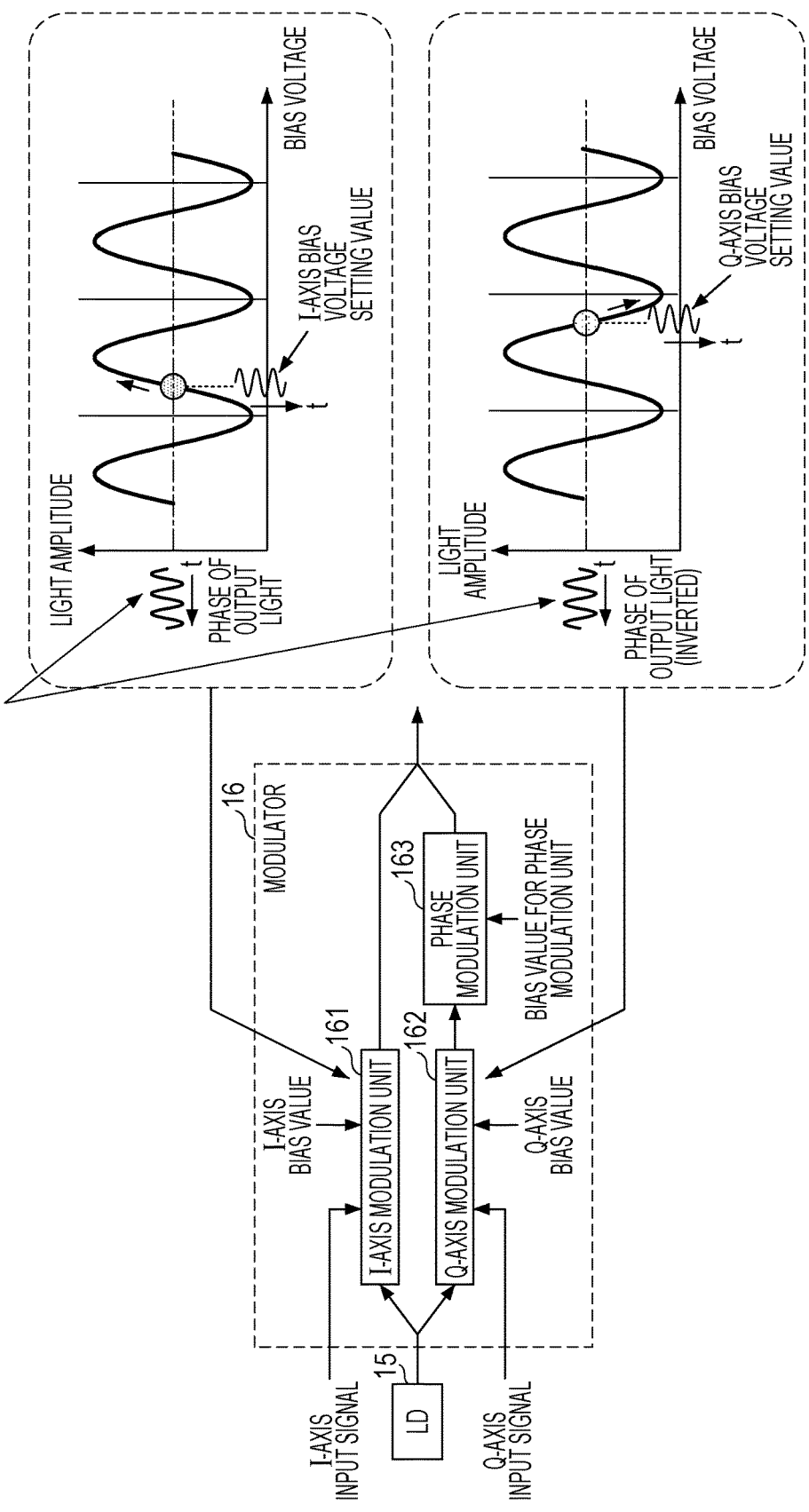
FIG. 3 is a diagram describing the setting of a bias voltage at the time of skew adjustment.

FIG. 3 is a diagram describing the exemplary setting of a bias voltage at the time of skew adjustment. In the example illustrated in FIG. 3, in the modulator 16, (a) the bias voltage of the phase modulation unit 163 is controlled such that there is no optical phase difference between light passing through the I axis and light passing through the Q axis in a case where the modulation of an input signal is not performed, and (b) the bias voltages of the I-axis modulation unit 161 and the Q-axis modulation unit 162 are controlled such that light passing through the I axis and light passing through the Q axis are identical in amplitude and are π out of optical phase with each other in a case where the modulation of an input signal is not performed.

In connection with the condition (b), a bias voltage with a direction in which a light amplitude increases is applied to the I-axis modulation unit 161 illustrated in FIG. 3 and a bias voltage with a direction in which a light amplitude decreases is applied to the Q axis. By performing this bias setting, a phase difference of π radians is provided between light passing through the I axis and light passing through the Q axis.

A case where an I-axis signal and a Q-axis signal that are identical in amplitude and frequency and are in phase with each other are input into the modulator 16 as skew adjustment signals will be considered. Light carrying an I-axis signal and a Q-axis signal propagates through the I-axis modulation unit 161 and the Q-axis modulation unit 162, so that the phases of them are 180° out of phase and cancel each other. Since the phase difference between the I axis and the Q axis is controlled to be zero in a state where the modulation of an input signal is not performed under the condition (a), the optical output of the modulator 16 becomes the minimum. In this case, at a time when monitor signal average power becomes the minimum, a skew between input signals is in the optimum state.

In contrast, in a case where test signals that are identical in amplitude and frequency and are π out of optical phase with each other are input into the I-axis modulation unit 161 and the Q-axis modulation unit 162, light output from the I-axis modulation unit 161 and light output from the Q-axis modulation unit 162 are in phase with each other. When they are coupled, resultant light has an amplitude twice the amplitude of them. In this case, at a time when monitor signal average power becomes the maximum, a skew between input signals is in the optimum state.

FIG. 4 is a diagram illustrating the waveform of monitor light entering the light-receiving element 171. In a waveform diagram, a horizontal axis represents a time and a vertical axis represents intensity. As a skew adjustment signal, for example a sinusoidal wave is input into the modulator 16. An optical signal that has double intensity in accordance with a bias set for the modulator 16 is output from the modulator 16. The center of the change in intensity of output light corresponds to an average power value.

Figure 5A:
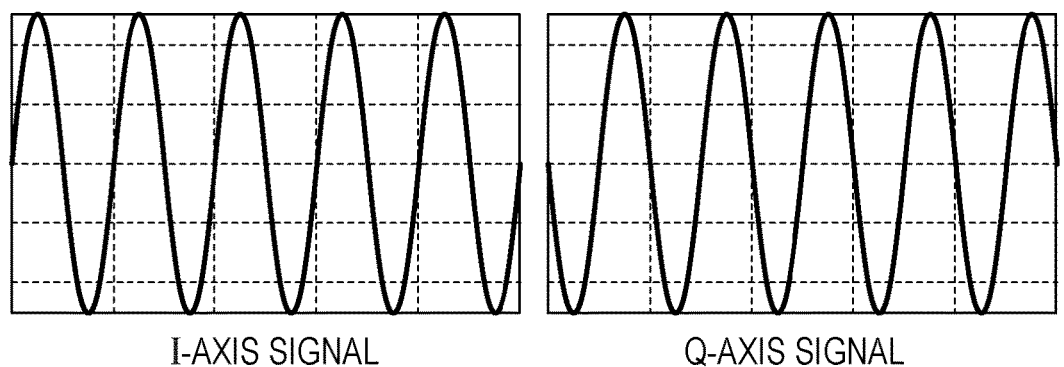
FIGS. 5A and 5B are diagrams illustrating the waveforms of signals and the waveform of monitor light in a case where a skew adjustment value is appropriately set.
Figure 5B:

FIGS. 5A and 5B are diagrams describing a transmission skew determination method. In the example illustrated in FIG. 5A, an I-axis signal and a Q-axis signal output from the signal generator 11 are sinusoidal waves (digital sampling signals) whose phases are rotated by π radians with respect to each other. Under the bias conditions (a) and (b) described with reference to FIG. 3, the phase difference of π radians is provided between light carrying an I-axis signal in the I-axis modulation unit 161 and light carrying a Q-axis signal in the Q-axis modulation unit 162 and light passing through the I axis and light passing through the Q axis strengthen each other. Since the phase rotation amount of the phase modulation unit 163 is zero, light with a double amplitude is output from the modulator 16.

As illustrated in FIG. 5B, when the average power of monitor light is the maximum, a skew amount included in a signal to be input into the power detector 18 is the minimum. This state is a state where a transmission skew amount occurring between the I axis and the Q axis and a skew adjustment value added by the skew adjuster 12 in advance cancel each other. The power detector 18 acquires the power value of a monitor signal and supplies the monitor signal to the controller 19. The controller 19 determines a skew adjustment value with which the power of monitor light becomes the maximum at a plurality of frequencies as a target adjustment value.

Figure 6A:
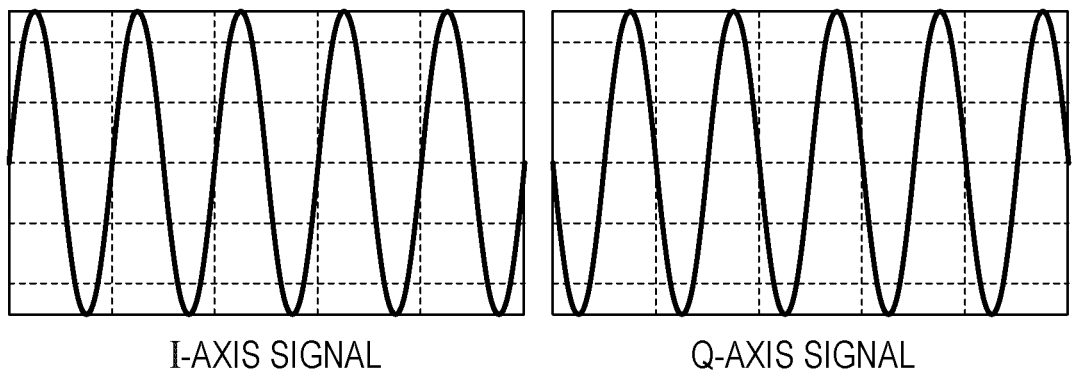
FIGS. 6A and 6B are diagrams illustrating the waveforms of signals and the waveform of monitor light in a case where a skew adjustment value is not appropriately set.
Figure 6B:
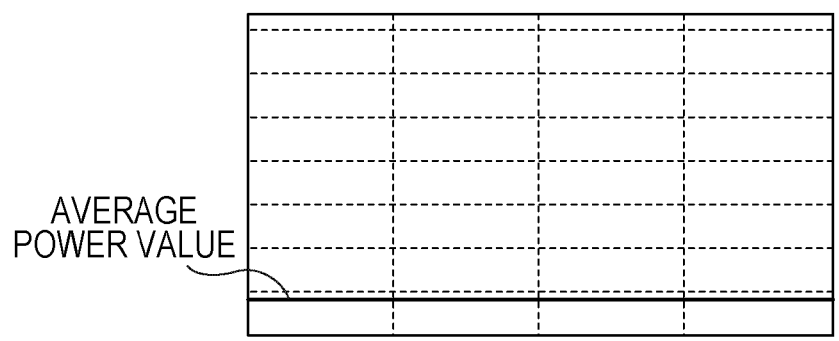

FIGS. 6A and 6B are diagrams illustrating a case where a skew adjustment value is not appropriately set under the same signal condition and the same bias condition as those described with reference to FIGS. 5A and 5B. A skew adjustment I-axis signal and a skew adjustment Q-axis signal are sinusoidal waves whose phases are rotated by π with respect to each other. The addition of a skew adjustment value performed by the skew adjuster 12 and a transmission skew occurring between I and Q cause, in a signal coupled by the modulator 16, a phase difference that is approximately −½ of a signal cycle. In this case, the average power value of monitor light decreases as illustrated in FIG. 6B.

As is apparent from FIGS. 5A to 6B, in a case where bias conditions are the above-described conditions (a) and (b) and signals of opposite phases are input as skew adjustment signals, a skew adjustment value is controlled such that the average power value of monitor light becomes the maximum. As a result, an optimum skew adjustment value can be set for the skew adjuster 12.

The following four control patterns of a skew adjustment value can be considered based on a method of setting a bias condition for the modulator 16 and the phase of a skew adjustment test signal.

In a control pattern 1, (a) the bias voltage of the phase modulation unit 163 is controlled such that an optical phase difference between I and Q becomes zero at the time of skew adjustment, (b) an I-axis bias and a Q-axis bias are controlled such that the optical phase difference of π is provided between I and Q, and (c) test signals of opposite phases are input into the I axis and the Q axis. In this case, a skew adjustment value is controlled such that the average power value of output light of the modulator 16 becomes the maximum.

In a control pattern 2, (a) the bias voltage of the phase modulation unit 163 is controlled such that an optical phase difference between I and Q becomes zero, (b) the I-axis bias and the Q-axis bias are controlled such that no optical phase difference is provided between I and Q, and (c) test signals of the same phase are input into the I axis and the Q axis. In this case, the signals of the same phase strengthen each other, and the intensity of output light of the modulator 16 increases. A skew adjustment value is controlled such that the average power value of output light of the modulator 16 becomes the maximum.

In a control pattern 3 in which the bias condition is the same as that of the control pattern 1 and test signals of the same phase are input, (a) the bias voltage of the phase modulation unit 163 is controlled such that an optical phase difference between I and Q becomes zero, (b) the I-axis bias and the Q-axis bias are controlled such that the optical phase difference of π is provided between I and Q, and (c) test signals of the same phase are input into the I axis and the Q axis. In this case, the test signals input into the I-axis modulation unit 161 and the Q-axis modulation unit 162 cancel each other. A skew adjustment value is controlled such that the average power value of output light of the modulator 16 becomes the minimum.

In a control pattern 4 in which the bias condition is the same as that of the control pattern 2 and test signals of opposite phases are input, (a) the bias voltage of the phase modulation unit 163 is controlled such that an optical phase difference between I and Q becomes zero, (b) the I-axis bias and the Q-axis bias are controlled such that no optical phase difference is provided between I and Q, and (c) test signals of opposite phases are input into the I axis and the Q axis. In this case, the test signals of opposite phases cancel each other, and the intensity of output light of the modulator 16 decreases. A skew adjustment value is controlled such that the average power value of output light of the modulator 16 becomes the minimum.

The controller 19 controls a skew adjustment value in a control pattern based on the setting of a bias condition at the time of skew adjustment and the phase relationship between a skew adjustment I-axis signal and a skew adjustment Q-axis signal generated by the signal generator 11.

Figure 7:
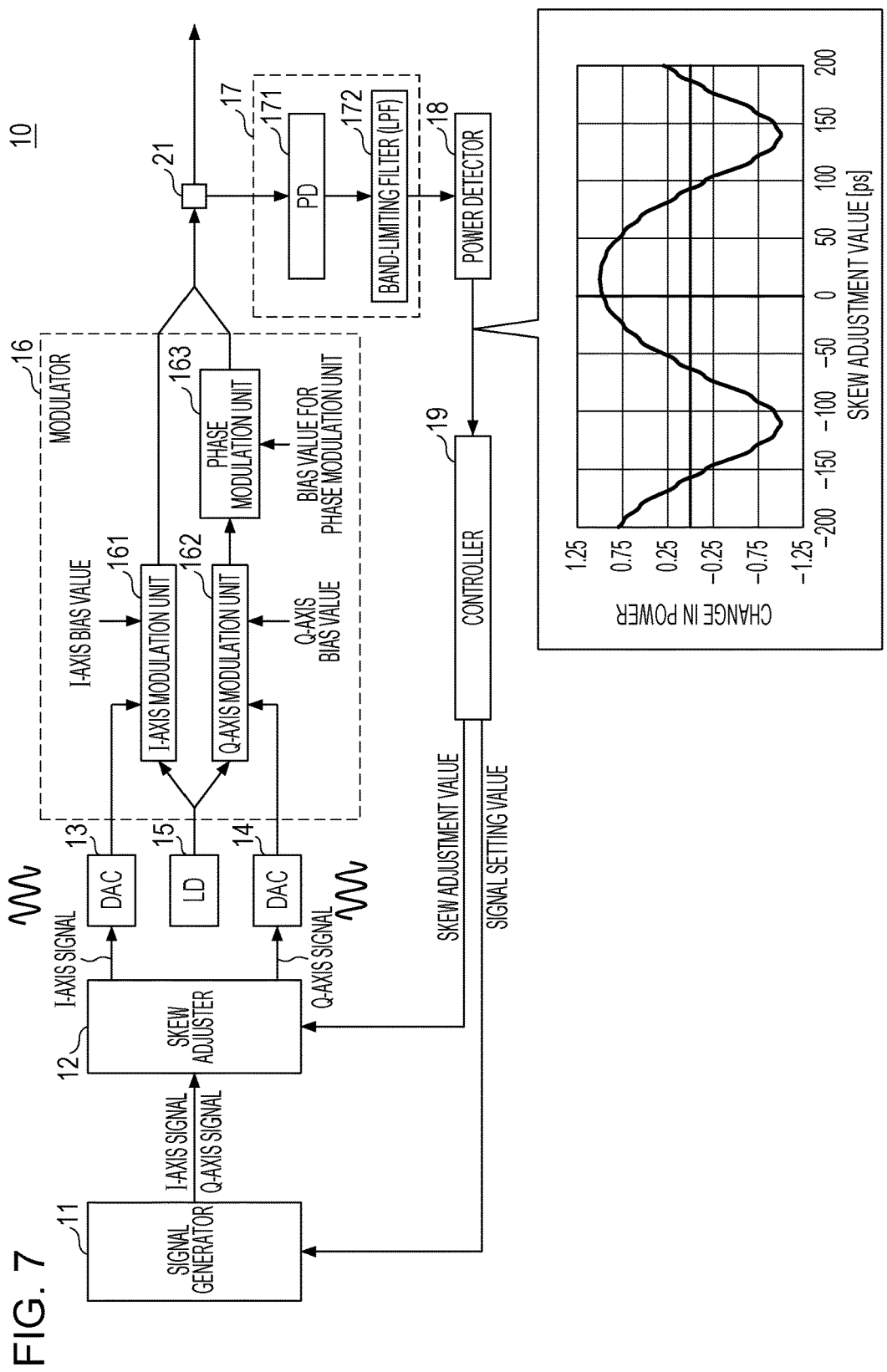
FIG. 7 is a diagram describing the principle of skew adjustment.

FIG. 7 is a diagram describing the principle of skew adjustment. It is assumed that the bias condition and the phase relationship between input signals in the control pattern 1 are set. It is also assumed that a skew adjustment I-axis signal and a skew adjustment Q-axis signal are signals that are identical in frequency and amplitude and are 180° out of phase. The power detector 18 detects the power of monitor light while the adjustment value set for the skew adjuster 12 is changed. The power of monitor light may be measured as the amount of change from a reference value. The change in a skew adjustment amount (pico second) changes the time average power of monitor light. The time average power of monitor light periodically changes in accordance with a skew (timing difference) amount. When a skew is the minimum, that is, a transmission skew between the I axis and the Q axis is correctly compensated for using a skew adjustment amount, a time average power value becomes the maximum in this example.

In a case where a single frequency is used for a skew adjustment signal, skew compensation is performed such that the average power of monitor light becomes the maximum or minimum based on the bias setting condition of the modulator 16 and the phase relationship between input signals as described with reference to FIGS. 5A to 6B. In this case, it is desirable that the frequency of a skew adjustment signal be set to a frequency at which skew adjustment can be accurately performed.

Although the increase in the frequency of a test signal generated by the signal generator 11 increases the accuracy of transmission skew control, the width of a detectable transmission skew amount is reduced. Although the decrease in the frequency of a test signal generated by the signal generator 11 reduces the accuracy of transmission skew control, the width of a detectable transmission skew amount is increased.

Figure 8A:
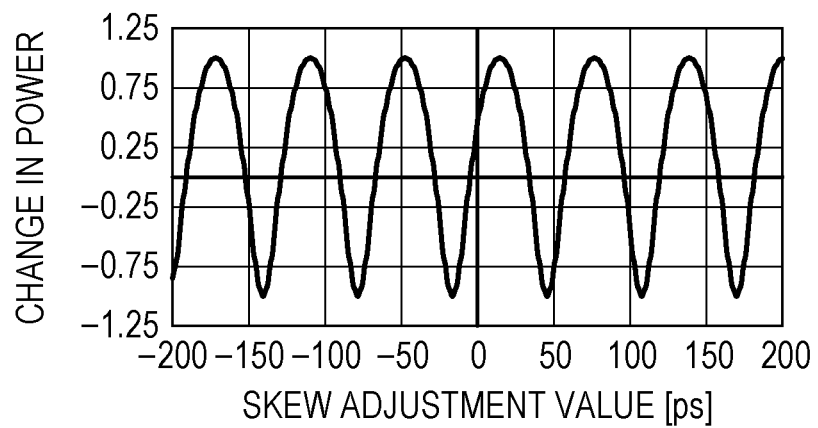
FIGS. 8A and 8B are diagrams illustrating relationships between a skew adjustment value and the power of monitor light at different frequencies.
Figure 8B:
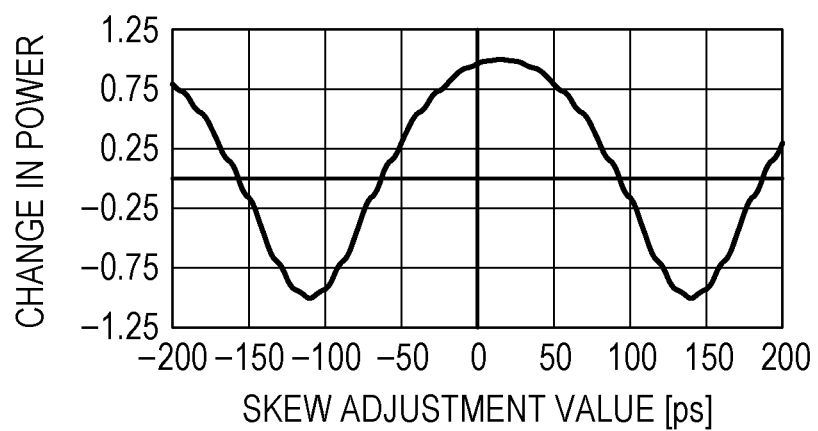

FIGS. 8A and 8B are diagrams illustrating relationships between a skew adjustment value and the power of monitor light at different frequencies. The power described with reference to these drawings represents average power. FIG. 8A illustrates a result of measurement performed by the power detector 18 in a case where the frequency of a test signal is high. FIG. 8B illustrates a result of measurement performed by the power detector 18 in a case where the frequency of a test signal is low. In the case where the frequency of a test signal is high, steep peaks are obtained and it is possible to accurately specify a skew adjustment value with which the maximum power value of monitor light is obtained. However, the width of a detectable transmission skew amount is in the range of 60 to 70 ps in the example illustrated in FIG. 8A. In the case where the frequency of a test signal is low, steepness at the peaks is lost and it is difficult to specify a skew adjustment value with which the maximum power value of monitor light is obtained. However, the width of a detectable transmission skew amount is increased to 250 ps in the example illustrated in FIG. 8B.

In this embodiment, in order to increase the accuracy of a skew adjustment value, test signals of different frequencies are used and a skew adjustment value is controlled such that the power value of monitor light becomes the maximum at all frequencies used or gets close to the minimum value depending on a bias condition and an input signal phase condition.

Figure 9:
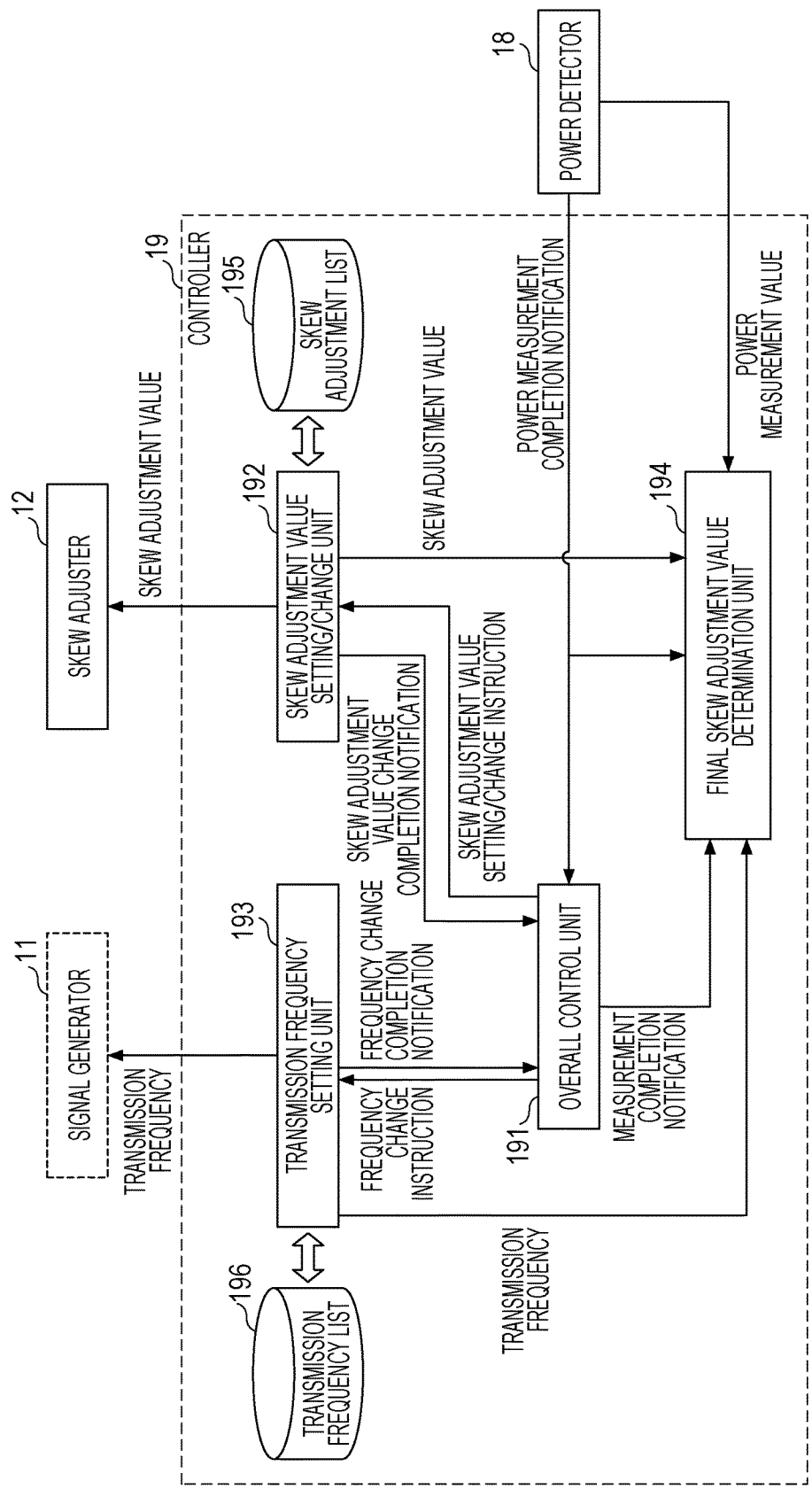
FIG. 9 is a schematic block diagram of a controller in an optical transmitter.

FIG. 9 is a schematic block diagram of the controller 19 in the optical transmitter 10. The controller 19 includes an overall control unit 191, a skew adjustment value setting/change unit 192, a transmission frequency setting unit 193, a final skew adjustment value determination unit 194, a skew adjustment list 195, and a transmission frequency list 196. The overall control unit 191, the skew adjustment value setting/change unit 192, the transmission frequency setting unit 193, and the final skew adjustment value determination unit 194 are realized by a logic device such as a field programmable gate array (FPGA) or a microprocessor. The skew adjustment list 195 and the transmission frequency list 196 are realized by a memory.

The overall control unit 191 controls the operation of each unit in the controller 19 and the entire operation of the optical transmitter 10. The skew adjustment value setting/change unit 192 refers to the skew adjustment list 195 at the time of skew adjustment, sets a skew adjustment initial value for the skew adjuster 12, and changes a skew adjustment value within a predetermined skew range. The skew adjustment value setting/change unit 192 changes a skew adjustment value within the skew range in response to an instruction for setting/changing a skew adjustment value transmitted from the overall control unit 191 and outputs a skew adjustment value completion notification to the overall control unit 191 after completing the change in a skew adjustment value within the whole range. When the final skew adjustment value determination unit 194 finally determines an optimum skew adjustment value, the skew adjustment value setting/change unit 192 sets the determined skew adjustment value for the skew adjuster 12 under the control of the overall control unit 191.

The skew adjustment list 195 stores skew adjustment information. The skew adjustment information includes information to be set for the skew adjustment unit. The information to be set for the skew adjustment unit may be stored in the form of, for example, a skew adjustment value at each frequency, the maximum and minimum values of a skew adjustment amount, and a step size at which a skew adjustment value varies.

The transmission frequency setting unit 193 refers to the transmission frequency list 196 to sequentially select skew adjustment signal frequencies and notifies the signal generator 11 of the selected frequency. In response to a frequency change instruction transmitted from the overall control unit 191, the transmission frequency setting unit 193 changes a frequency to be set for the signal generator 11 and outputs a frequency change completion notification to the overall control unit 191 after completing the change in the frequency.

The transmission frequency list 196 stores a list of frequencies of a test signal to be used for skew adjustment. The transmission frequency list 196 stores, for example, the list of frequencies such as 2 GHz, 4 GHz, 8 GHz, and 16 GHz.

The final skew adjustment value determination unit 194 receives information about a current skew adjustment value from the skew adjustment value setting/change unit 192 and acquires the power measurement value of monitor light corresponding to the skew adjustment value from the power detector 18. The final skew adjustment value determination unit 194 also receives information about a currently set frequency from the transmission frequency setting unit 193. Based on these pieces of information, the final skew adjustment value determination unit 194 generates information about the power of monitor light measured while a skew adjustment value is changed at each frequency. Upon receiving a notification about the completion of measurement at all frequencies from the overall control unit 191, the final skew adjustment value determination unit 194 finally determines an optimum skew adjustment value to be set for the skew adjuster 12. An optimum skew adjustment value is a skew adjustment amount with which the power value of monitor light becomes the optimum value at all of a plurality of frequencies.

The power detector 18 outputs a power measurement completion notification to the overall control unit 191 in a case where the average power value of a monitor signal output from the monitor circuit 17 is stable for a predetermined period. Upon receiving the power measurement completion notification, the overall control unit 191 outputs a measurement completion notification to the final skew adjustment value determination unit 194.

Figure 10:
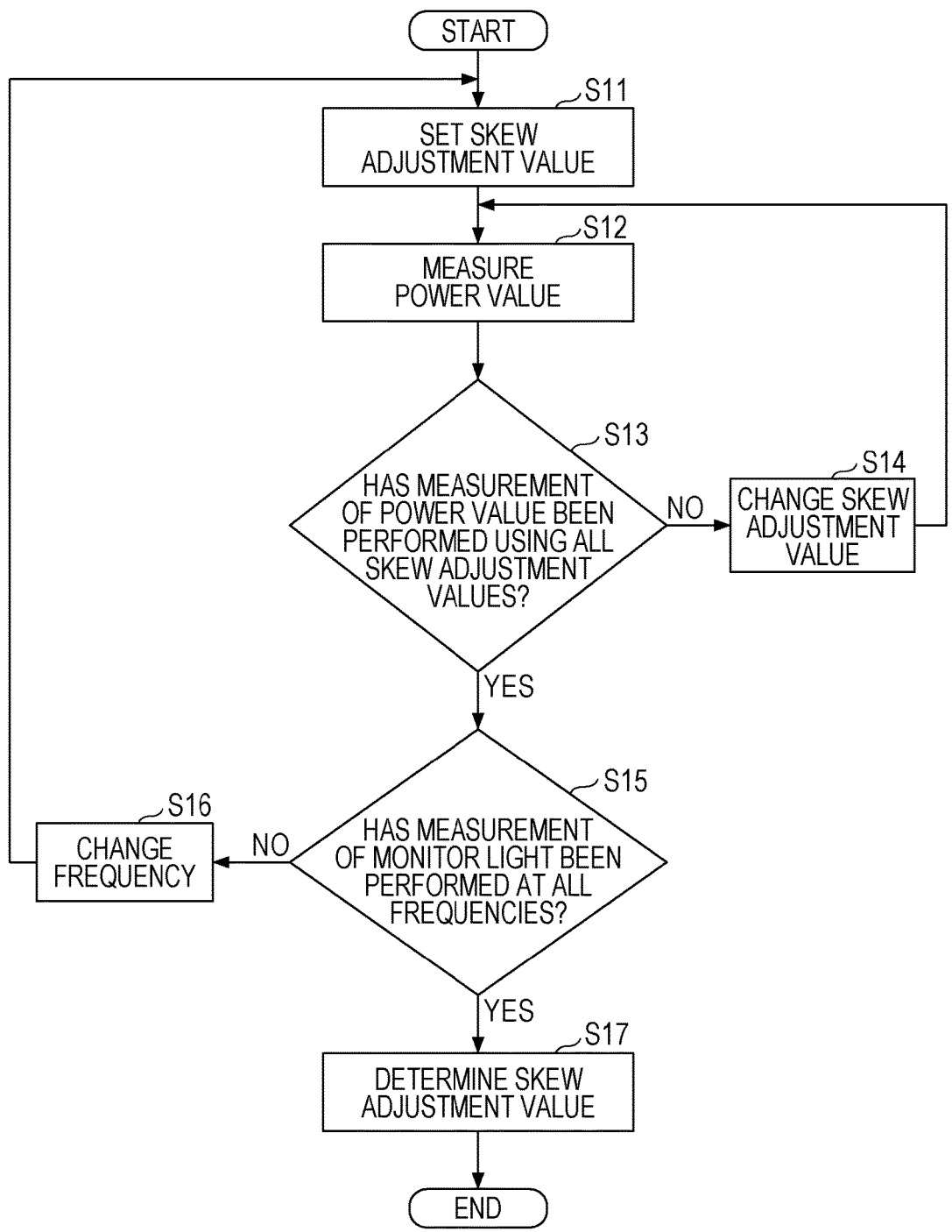
FIG. 10 is a flowchart illustrating a skew compensation method performed by a controller.

FIG. 10 is a flowchart illustrating a control process performed by the controller 19. Before operation, for example, at the time of startup of the optical transmitter 10, skew adjustment is started. First, a skew adjustment value to be set for the skew adjuster 12 is set to an initial value (S11). The power value of monitor light is acquired using the set skew adjustment value (S12). The skew adjustment initial value may be the minimum or maximum value in a skew adjustment range or may be 0 [ps].

It is determined whether all skew adjustment values in the skew adjustment range have been used for the detection of a power value of monitor light (S13). In a case where there is a skew adjustment value that has yet to be used for measurement (NO in S13), a skew adjustment value is changed at a predetermined step size (S14). The process returns to operation S12 in which a power value is measured. The process from operations S12 to S14 is repeated until the measurement of a power value of monitor light has been completed using all skew adjustment values.

When measure has been completed in the whole skew adjustment range (YES in S13), it is determined whether the measurement of monitor light has been performed at all frequencies used for skew adjustment (S15). In a case where there is a frequency that has yet to be used for measurement of monitor light (NO in S15), the change in a frequency is performed (S16). The process returns to operation S11. The process from operations S11 to S15 is repeated at a newly set frequency.

When power measurement has been completed at all frequencies for skew adjustment (YES in S15) while a skew adjustment value is changed, a skew adjustment value with which an optimum power value is obtained at all frequencies is determined as an optimum skew adjustment value (S17). The process ends.

The optimum power value is, for example, the maximum power value of monitor light in a case where test signals of opposite phases are input into the I axis and the Q axis and the bias voltage of the modulator 16 provides the phase difference of $\pi$ between the I axis and the Q axis. The optimum power value is, for example, the minimum power value of monitor light in a case where test signals of the same phase are input into the I axis and the Q axis under the same bias condition.

The determined skew adjustment value is finally set for the skew adjuster 12 and is used for skew compensation during the operation of the optical transmitter 10.

Figure 11A:
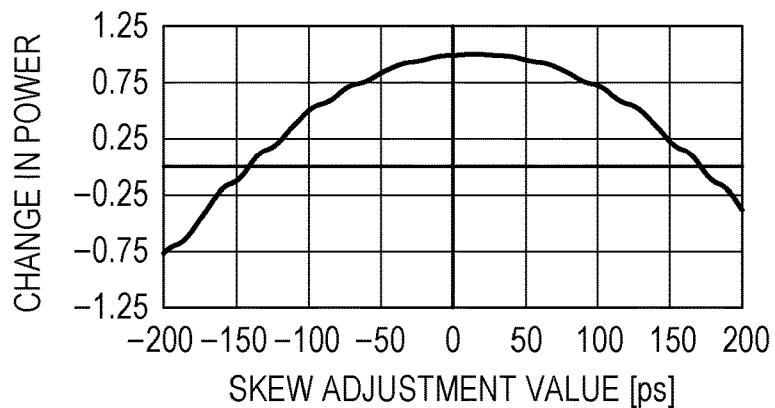
FIGS. 11A to 11C are diagrams illustrating exemplary power profiles of monitor light measured at different frequencies while a skew adjustment value is changed.
Figure 11B:
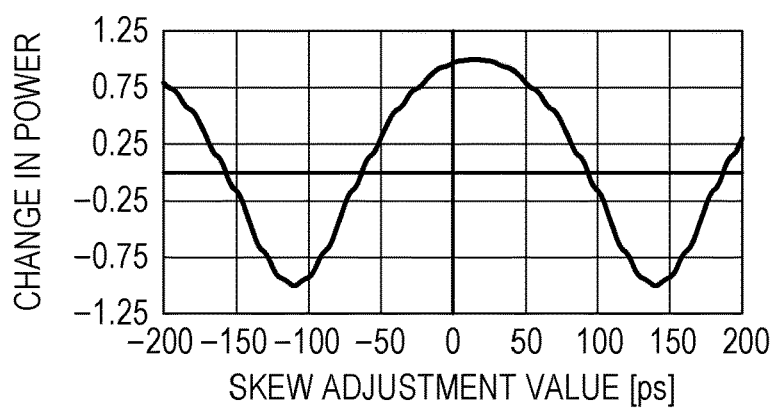
Figure 11C:
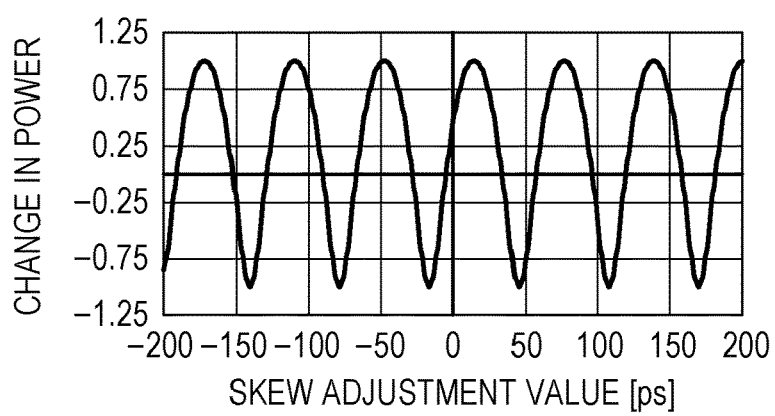

FIGS. 11A to 11C are diagrams illustrating exemplary power profiles of monitor light measured at different frequencies in the skew adjustment control process. When the frequency of a test signal is changed to a first frequency f1, a second frequency f2, and a third frequency f3, the cycle of a measured power change is also changed. When the frequency of a test signal increases (f1<f2<f3), the number of peaks appearing in the skew adjustment range increases. In addition, the range of a detectable skew amount is also changed in accordance with a frequency.

FIG. 12 is a diagram illustrating the relationship between the frequency of a skew adjustment test signal and a detectable skew amount. In the case of, for example, the frequency of 16 GHz, a skew delay amount in which peak power is observed can be specified by performing sweeping in the range of approximately ±31 ps. This frequency corresponds to f3 in FIG. 11C. In the case of the frequency of 8 GHz, a skew delay amount in which peak power is observed can be specified by performing sweeping in the range of approximately ±62 ps. In the case of the frequency of 4 GHz, a skew delay amount in which peak power is observed can be specified by performing sweeping in the range of approximately ±125 ps. This frequency corresponds to f2 in FIG. 11B. In the case of the frequency of 2 GHz, a skew delay amount in which peak power is observed can be specified by performing sweeping in the range of approximately ±250 ps. This frequency corresponds to f1 in FIG. 11A.

Figure 13:
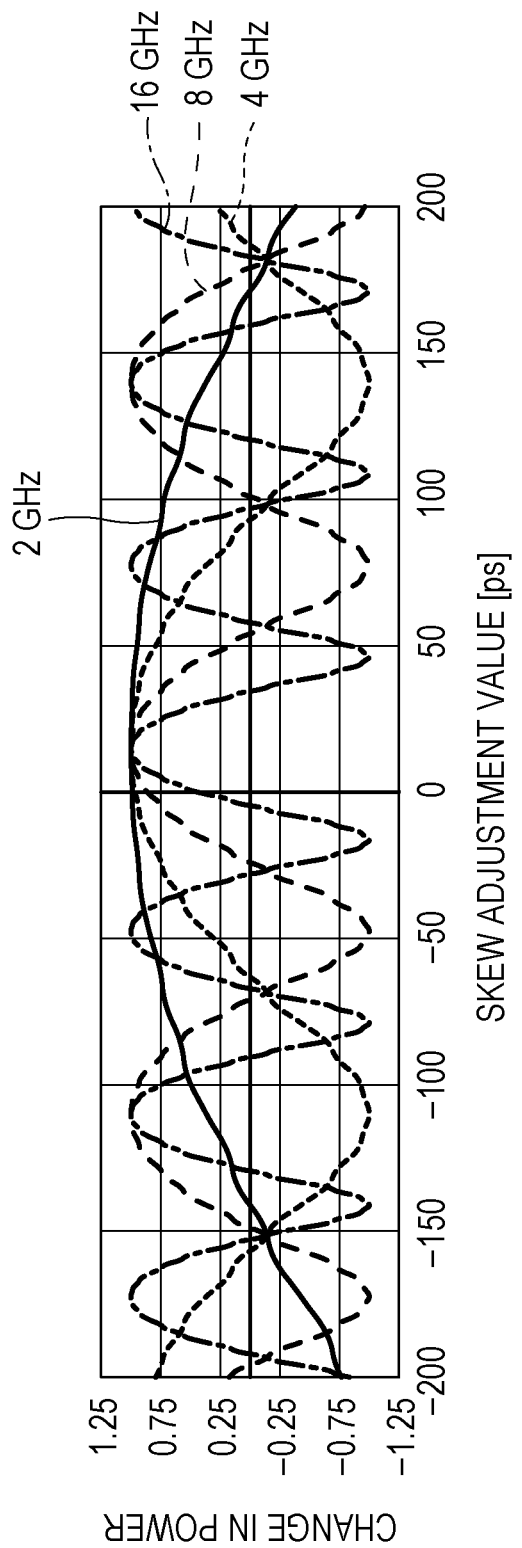
FIG. 13 is a diagram describing a method of determining a point at which an optimum power value is obtained at all frequencies as a skew adjustment value.

FIG. 13 is a diagram describing a method of determining a point at which an optimum power value is obtained at all frequencies used for skew adjustment as an optimum skew adjustment value. Test signals input into the I axis and the Q axis are identical in amplitude and frequency. In the example illustrated in FIG. 13, it is assumed that the maximum transmission skew range that can occur is ±200 [ps] and design is performed such that the maximum power value is obtained with the optimum skew adjustment value. Specifically, a bias value is set such that the optical phase rotation of π occurs between the I axis and the Q axis of the modulator 16 and test signals of opposite phases are input into the modulator 16 (the control pattern 1). Alternatively, a bias voltage may be set such that no optical phase difference is provided between light waves passing through the I axis and the Q axis of the modulator 16 and test signals that are identical in amplitude and frequency and are in phase with each other may be input into the modulator 16 (the control pattern 2).

The power of monitor light is acquired at each frequency while a skew adjustment value is changed. The result of this acquisition is that the skew adjustment value with which the maximum power value is obtained at all frequencies is 15 [ps]. This means that a transmission skew amount occurring in the optical transmitter 10 is −15 ps. In order to compensate for this transmission skew, the skew adjustment amount of 15 [ps] is set for the skew adjuster 12. With this method, it is possible to set an optimum skew compensation amount on a transmission side without using information transmitted from a receiving side.

[First Modification]

Figure 14A:
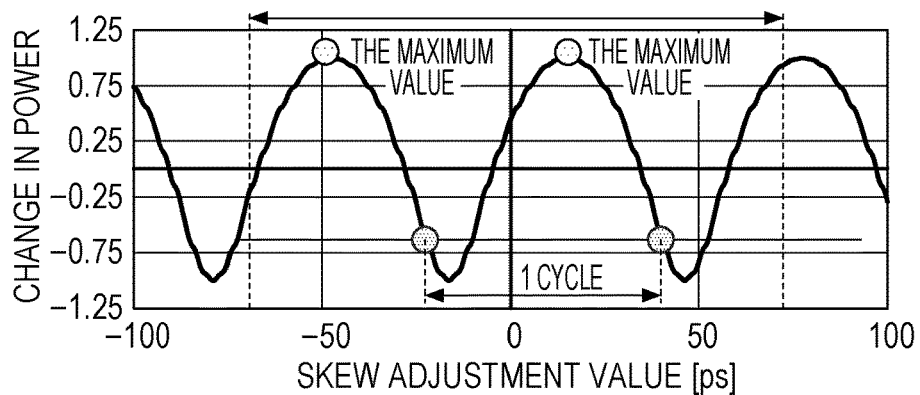
FIGS. 14A to 14C are diagrams describing a skew adjustment amount determination method in a first modification.
Figure 14B:
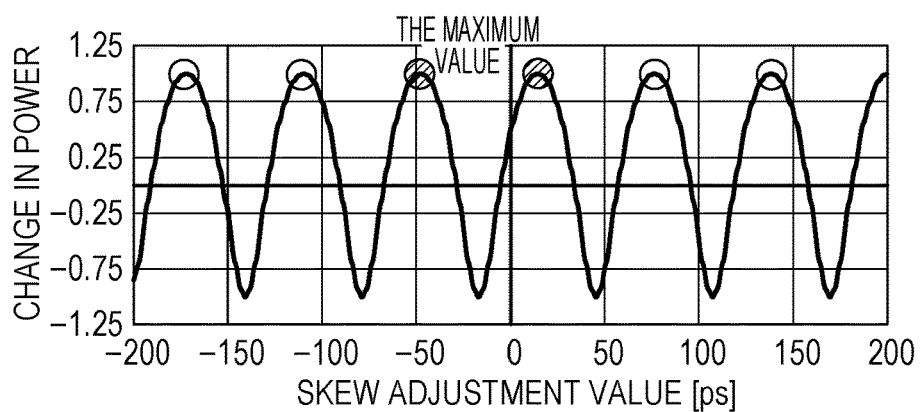
Figure 14C:
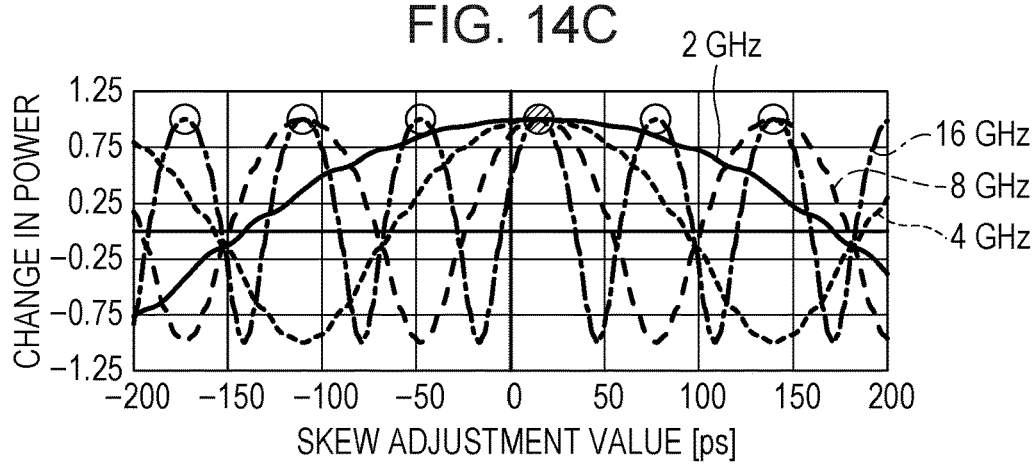

FIGS. 14A to 14C are diagrams describing the first modification of a skew adjustment amount. In the above-described embodiment, sweeping of a skew adjustment value is performed in the whole skew range at each frequency. However, in the first modification, a skew adjustment value candidate is selected and the measurement of power of monitor light is performed only near the candidate value. As a result, a skew adjustment value change section can be narrowed and the number of times of changing a skew adjustment value can be reduced.

First, as illustrated in FIG. 14A, the power value of monitor light is acquired at a certain frequency in at least one cycle while a skew adjustment value is changed. At least one skew adjustment value with which optimum (for example, the maximum) power is measured is obtained. If the cycle is known, another optimum point (for example, a point at which the maximum power is obtained) is estimated based on the cyclic relationship between a skew adjustment value and the intensity of monitor light. In the example illustrated in FIG. 14A, sweeping is performed in the section of two cycles and two points at which the maximum power is measured are obtained. As the first frequency used for candidate determination, it is desirable that the highest one of a plurality of frequencies for skew adjustment be used.

In the example illustrated in FIG. 14B, other candidate points (skew adjustment values) at which the maximum power is measured are obtained based on the periodicity of a power profile. In the drawing, additional candidate points are represented by white circles.

In the example illustrated in FIG. 14C, at other frequencies, the power of monitor light is obtained at each candidate point and near the candidate point. A skew adjustment value with which the maximum power is measured at all frequencies used for skew adjustment is determined as a final skew adjustment value to be set for the skew adjuster 12.

In this method, since the power of monitor light is obtained only near a skew adjustment value candidate with which an optimum power value is acquired while a skew adjustment value is changed, a time taken to determine a skew adjustment value can be shortened and the volume of processing can be reduced.

Figure 15:
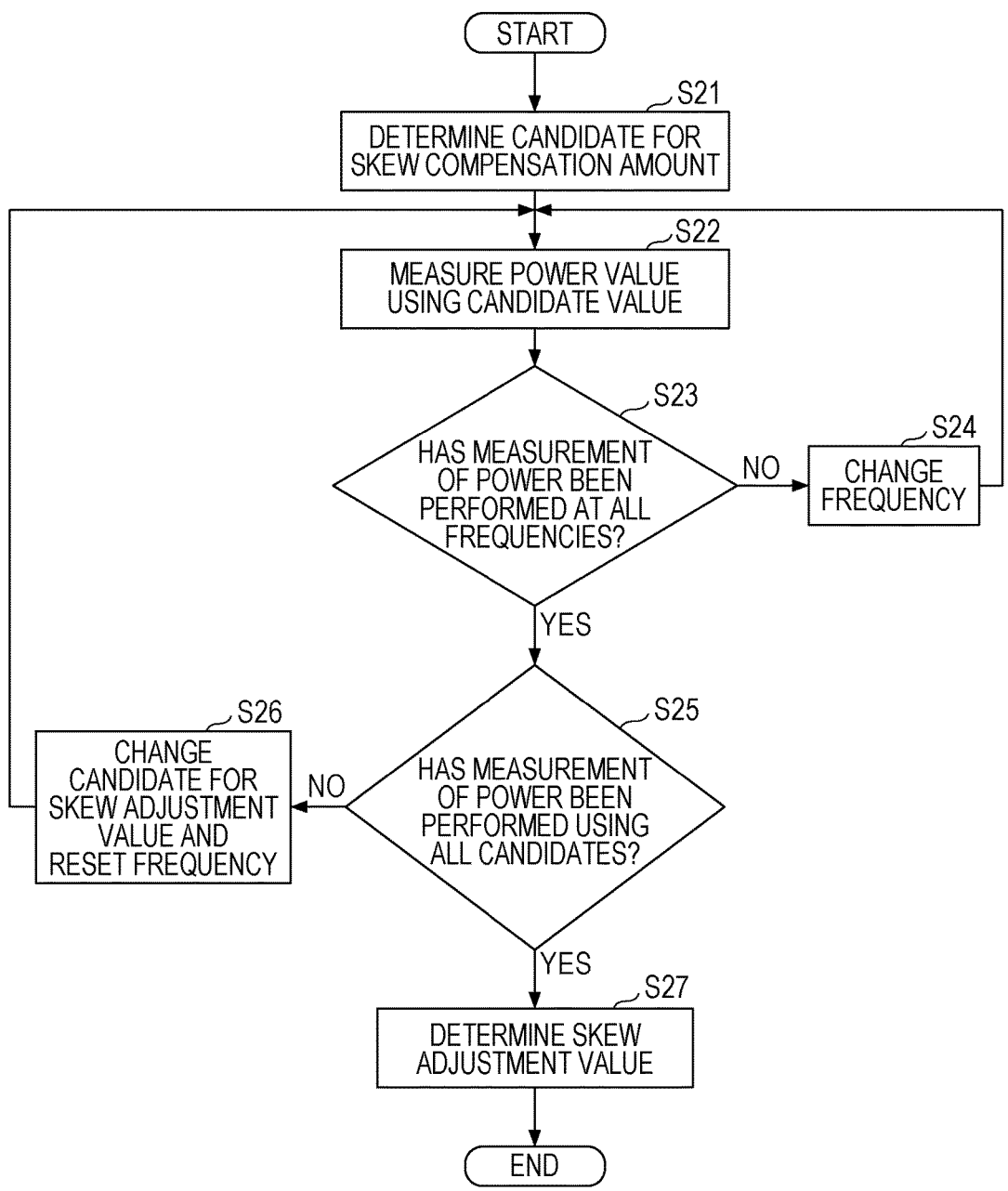
FIG. 15 is a flowchart illustrating a skew compensation method in the first modification.

FIG. 15 is a flowchart of the first modification. When skew adjustment is started before an operation, for example, at the time of startup, a candidate for a skew compensation amount (skew adjustment value) is determined at a certain frequency (S21). In the section of at least one cycle of a monitor light power profile, the power of monitor light is measured at the selected frequency while a skew adjustment value is changed. At least one point at which optimum (for example, the maximum) power is measured is obtained as a candidate point. Based on the cyclic relationship between a skew adjustment value and the power of monitor light, a point located at a predetermined distance from the obtained candidate point is determined as a candidate for a skew adjustment value. It is desired that the highest one of a plurality of frequencies be used as the first selected frequency.

The power of monitor light at each frequency is measured at the first candidate (skew delay value) and only near the first candidate (S22). It is determined whether the measurement of power has been performed at all frequencies used for skew adjustment (S23). In a case where there is a frequency that has yet to be used for measurement (NO in S23), the change in a frequency is performed (S24). The process from operations S22 to S23 is repeated until the measurement of power has been completed at the current candidate point using all frequencies.

When the measurement of power has been completed at the current candidate point using all frequencies (YES in S23), it is determined whether the measurement of power has been completed at all candidate points using all frequencies (S25). In a case where there is a candidate point at which the measurement of power has yet to be performed (NO in S25), the process from operations S22 to S26 is repeated until the measurement of power has been completed at all candidate points.

In a case where the measurement of power has been completed at all candidate points using all frequencies (YES in S25), one of the candidate points at which the optimum power is measured at all frequencies is determined as a final skew adjustment value (S27). The process ends.

This method is advantageous in that a skew adjustment time is short and the volume of processing is small.

[Second Modification]

Figure 16:
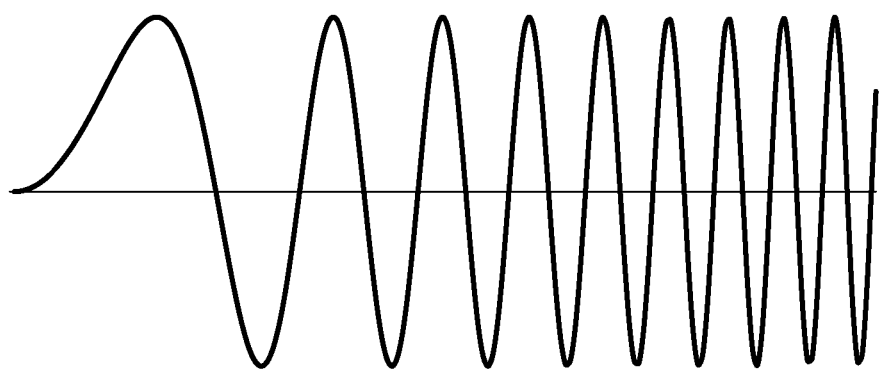
FIG. 16 is a diagram illustrating an example of a chirp signal used in a second modification.
Figure 17:
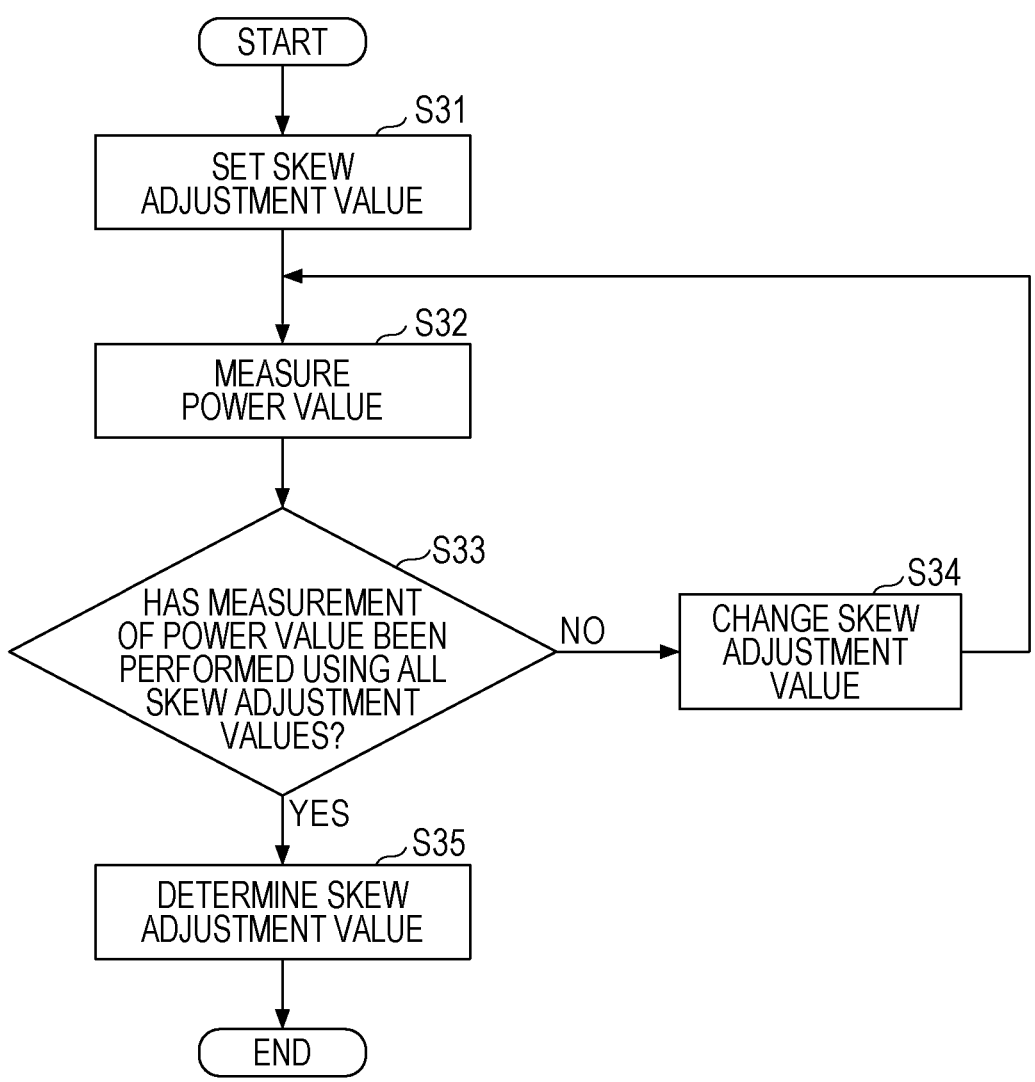
FIG. 17 is a flowchart illustrating a skew compensation method using a chirp signal.

FIG. 16 is a diagram illustrating an example of the second modification of an embodiment in which a chirp signal whose frequency continuously changes is used. A chirp signal is a signal whose frequency increases or decreases with time. The frequency of a chirp signal may linearly or exponentially change. A signal obtained by chirping a sinusoidal wave becomes the sinusoidal function of a phase. Since a frequency changes along a time axis, the same effect can be obtained as in the case of adjusting a skew compensation amount while sequentially changing a frequency. By repeatedly outputting a chirp signal from the signal generator 11 for a predetermined time, the same effect can be obtained in the case of measuring the power of monitor light at a plurality of frequencies even if frequency change processing is not performed. FIG. 17 is a flowchart illustrating a process in the second modification. First, a skew adjustment value is set to an initial value (S31). An I-axis chirp signal and a Q-axis chirp signal are input into the modulator 16 and the power of monitor light is measured (S32). Since a chirp signal is repeatedly output, a skew adjustment value is fixed until a stable power measurement value is obtained. A time taken to obtain a stable power measurement value changes depending on the rate of change of frequency of a chirp signal with respect to time and a measurement target frequency band.

Subsequently, it is determined whether the power of monitor light has been measured using all skew adjustment values in a predetermined skew adjustment range (S33). In a case where there is a skew adjustment value that has yet to be used for power measurement (NO in S33), the change in a skew adjustment value is performed and the process returns to operation S32. The process from operations S32 to S34 is repeated until the power of monitor light has been measured using all skew adjustment values.

In a case where the power of monitor light has been measured using all skew adjustment values (YES in S33), a skew adjustment amount with which optimum power is obtained is determined as an optimum skew adjustment amount (S35). The process ends. In this method, it is unnecessary to change a frequency for skew adjustment.

Figure 18:
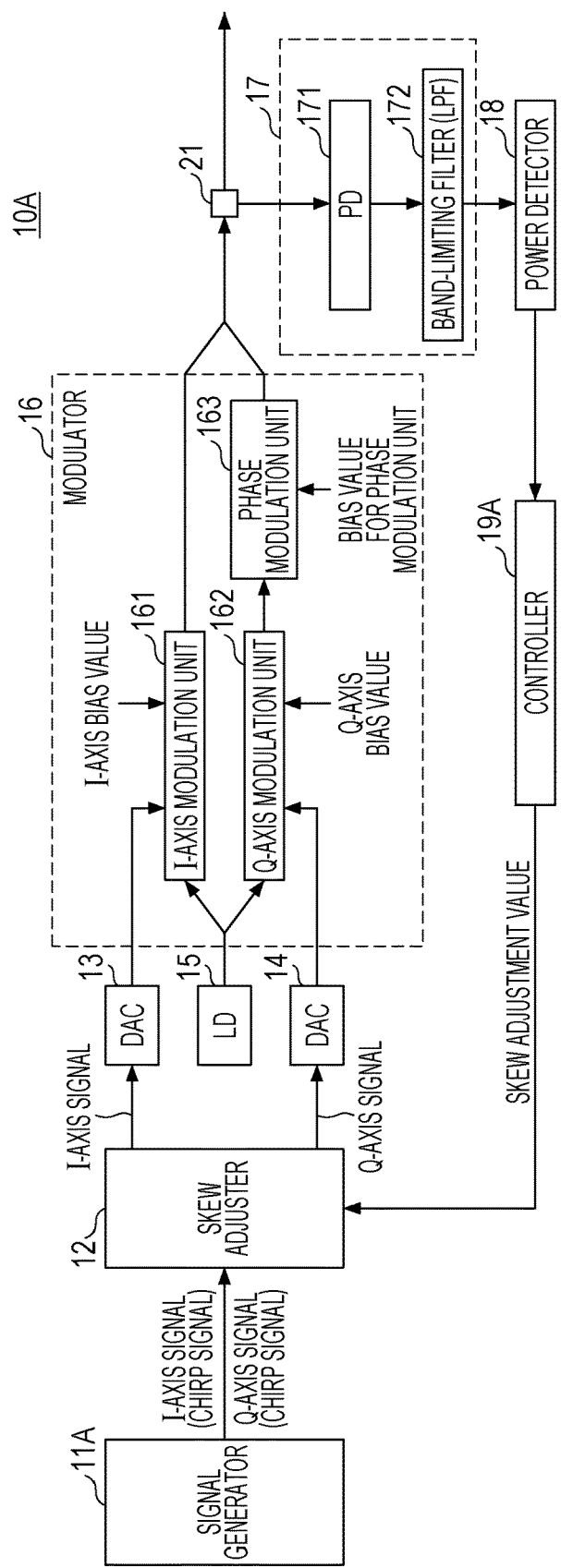
FIG. 18 is a diagram illustrating an exemplary configuration of an optical transmitter in the second modification.

FIG. 18 is a schematic diagram of an optical transmitter 10A that is the second modification. In FIG. 18, the same reference numeral is used to represent the same component in the optical transmitter 10 illustrated in FIG. 1 so as to avoid repeated explanation.

In the optical transmitter 10A that is the second modification, an instruction for changing the setting of a test signal for skew adjustment is not supplied from a controller 19A to a signal generator 11A. The signal generator 11A outputs predetermined chirp signals as an I-axis signal and a Q-axis signal. The I-axis chirp signal and the Q-axis chirp signal generated and output by the signal generator 11A are in-phase chirp signals whose amplitudes and frequencies change in the same manner or anti-phase chirp signals whose amplitudes and frequencies change in the same manner. This chirp signal type changes based on a control method.

The I-axis chirp signal and the Q-axis chirp signal are subjected to skew compensation using a skew adjustment value set for the skew adjuster 12 and are then input into the I-axis modulation unit 161 and the Q-axis modulation unit 162, respectively. The phases of the I axis chirp signal and the Q-axis chirp signal and a bias voltage set for the modulator 16 are determined based on how an optimum power value, which is to be used for the determination of an optimum skew adjustment value, is set. Any one of the above-described control patterns 1 to 4 may be used.

The output light of the modulator 16 is monitored by the monitor circuit 17. The power of monitor light is detected by the power detector 18. The controller 19A performs the process illustrated in FIG. 17 based on an input power detection result to determine an optimum skew adjustment value and sets the determined skew adjustment value for the skew adjuster 12.

Figure 19:
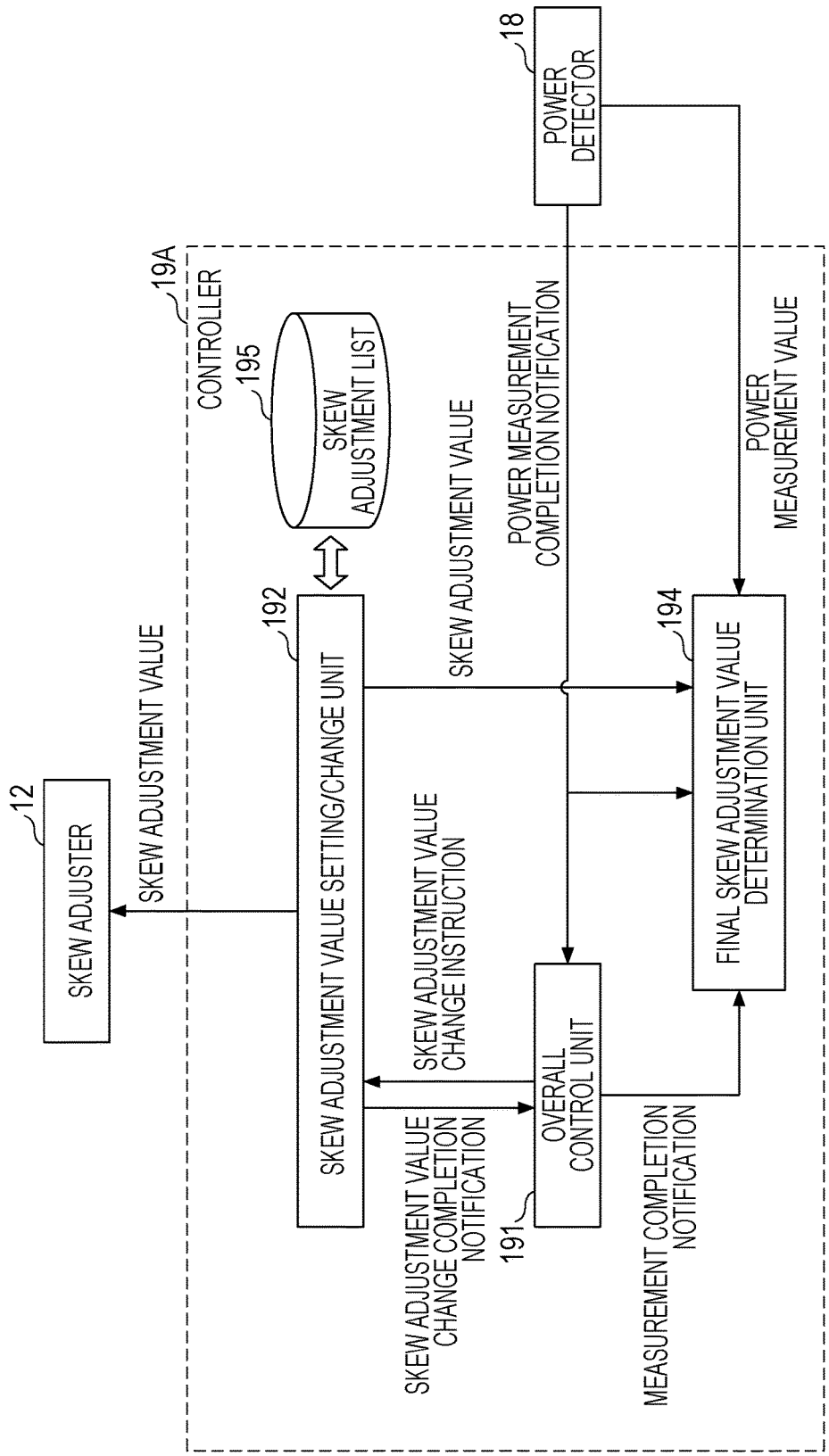
FIG. 19 is a diagram illustrating an exemplary configuration of a controller in the second modification.

FIG. 19 is a schematic block diagram of the controller 19A. In FIG. 19, the same reference numeral is used to represent the same component in the controller 19 illustrated in FIG. 9 so as to avoid repeated explanation. The controller 19A includes the overall control unit 191, the skew adjustment value setting/change unit 192, the final skew adjustment value determination unit 194, and the skew adjustment list 195. The overall control unit 191 refers to the skew adjustment list 195 at the time of skew adjustment, sets a skew adjustment initial value for the skew adjuster 12, and changes a skew adjustment value within a predetermined skew range. The skew adjustment value setting/change unit 192 changes a skew adjustment value within the skew range in response to an instruction for setting/changing a skew adjustment value transmitted from the overall control unit 191. Also in the case of a chirp signal, a skew adjustment value is fixed until a stable power measurement value is obtained. The skew adjustment value setting/change unit 192 outputs a skew adjustment value completion notification to the overall control unit 191 after completing the change in a skew adjustment value to be used for measurement. When the final skew adjustment value determination unit 194 finally determines an optimum skew adjustment value, the skew adjustment value setting/change unit 192 sets the determined skew adjustment value for the skew adjuster 12 under the control of the overall control unit 191.

The final skew adjustment value determination unit 194 receives information about a current skew adjustment value from the skew adjustment value setting/change unit 192 and acquires the power measurement value of monitor light corresponding to the skew adjustment value from the power detector 18. Upon receiving a measurement completion notification from the overall control unit 191, the final skew adjustment value determination unit 194 finally determines an optimum skew adjustment value to be set for the skew adjuster 12. The optimum skew adjustment value can be determined in the same manner as in the case of determining an optimum skew adjustment value using the control patterns 1 to 4. An optimum skew adjustment amount is set for the skew adjuster 12 and is used for skew compensation during the operation of the optical transmitter 10A. With the configuration of the second modification, it is possible to determine an optimum skew adjustment value without performing the change in a frequency.

In this specification and claims, the term of an "I axis" represents an "in-phase axis" handling a component that is in phase with a carrier wave, and the term of a "Q axis" represents an "orthogonal axis" handling a component that is 90° out of phase with a carrier wave. The term of "in-phase" signals represent signals of the same phase, and the term of "anti-phase" signals represent signals that are 180° out of phase with each other.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:
1. An optical transmitter comprising:
a modulator;
a signal generator configured to generate in-phase or anti-phase skew adjustment signals that are identical in amplitude and frequency as signals to be input into an I axis and a Q axis of the modulator;
a skew adjuster configured to perform skew adjustment upon the skew adjustment signals;
a light source configured to enter light into the modulator;

a monitor configured to monitor light that has been modulated using the skew adjustment signals and output from the modulator;

a power detector configured to detect power of monitor light; and a controller configured to determine a skew adjustment amount with which average power of the monitor light is at a maximum or minimum value as an optimum skew adjustment value while changing a skew adjustment amount of the skew adjuster, wherein the signal generator generates the skew adjustment signal at a plurality of frequencies, and wherein the controller acquires average power of the monitor light at the plurality of frequencies while changing a skew adjustment amount of the skew adjuster, and determines a skew adjustment amount with which average power of the monitor light is at the maximum or minimum value at all of the plurality of frequencies as an optimum skew adjustment value.

2. The optical transmitter according to claim 1, wherein the controller determines a candidate value of a skew adjustment value at a first frequency, acquires average power of the monitor light at frequencies other than the first frequency using other candidate values near the candidate value, and determines a candidate value with which an optimum power value is obtained at the plurality of frequencies as an optimum skew adjustment value.

3. The optical transmitter according to claim 1, wherein the signal generator generates and outputs in-phase or anti-phase chirp signals whose amplitudes change in the same manner and frequencies change in the same manner as the skew adjustment signals.

4. The optical transmitter according to claim 1, wherein the signal generator generates and outputs in-phase or anti-phase sinusoidal signals that are identical in amplitude and frequency as the skew adjustment signals.

5. An optical transmitter comprising:

a modulator including an I-axis modulation unit, a Q-axis modulation unit, and a phase modulation unit;

a signal generator configured to generate in-phase or anti-phase skew adjustment signals that are identical in amplitude and frequency as signals to be input into an I axis and a Q axis of the modulator;

a skew adjuster configured to perform skew adjustment upon the skew adjustment signals;

a light source configured to enter light into the modulator;

a monitor configured to monitor light that has been modulated using the skew adjustment signals and output from the modulator;

a power detector configured to detect power of monitor light; and a controller configured to determine a skew adjustment amount with which average power of the monitor light is at a maximum or minimum value as an optimum skew adjustment value while changing a skew adjustment amount of the skew adjuster, wherein a bias voltage of the phase modulation unit is set such that a phase difference between light passing through an I axis and light passing through a Q axis becomes a minimum in a state where an input signal is not modulated, wherein a bias voltage of the I-axis modulation unit and a bias voltage of the Q-axis modulation unit are set such that light passing through the I axis and light passing through the Q axis are inverted in optical phase by $\pi$ radians in a state where an input signal is not modulated, wherein the signal generator generates anti-phase signals that are identical in amplitude and frequency as the skew adjustment signals, and wherein the controller determines a skew adjustment amount with which average power of the monitor light becomes a maximum as an optimum skew adjustment amount or a minimum as an optimum skew adjustment amount.

6. An optical transmitter comprising:

a modulator including an I-axis modulation unit, a Q-axis modulation unit, and a phase modulation unit;

a signal generator configured to generate in-phase or anti-phase skew adjustment signals that are identical in amplitude and frequency as signals to be input into an I axis and a Q axis of the modulator;

a skew adjuster configured to perform skew adjustment upon the skew adjustment signals;

a light source configured to enter light into the modulator;

a monitor configured to monitor light that has been modulated using the skew adjustment signals and output from the modulator;

a power detector configured to detect power of monitor light; and a controller configured to determine a skew adjustment amount with which average power of the monitor light is at a maximum or minimum value as an optimum skew adjustment value while changing a skew adjustment amount of the skew adjuster, wherein a bias voltage of the phase modulation unit is set such that a phase difference between light passing through an I axis and light passing through a Q axis becomes a minimum in a state where an input signal is not modulated, wherein a bias voltage of the I-axis modulation unit and a bias voltage of the Q-axis modulation unit are set such that light passing through the I axis and light passing through the Q axis have same optical phase in a state where an input signal is not modulated, wherein the signal generator generates in-phase signals that are identical in amplitude and frequency as the skew adjustment signals, and wherein the controller determines a skew adjustment amount with which average power of the monitor light becomes a maximum as an optimum skew adjustment amount or a minimum as an optimum skew adjustment amount.

* * * * *